Patented Feb. 3, 1953

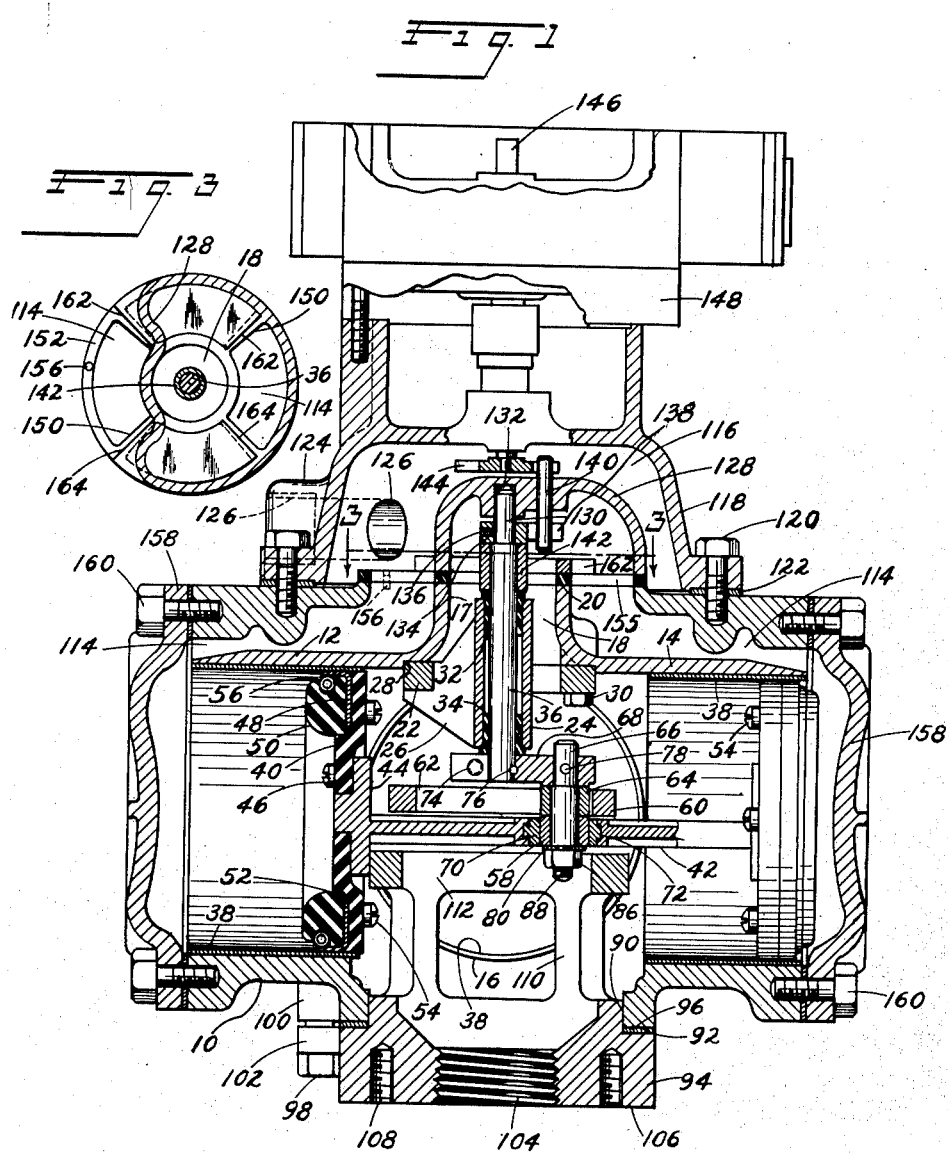
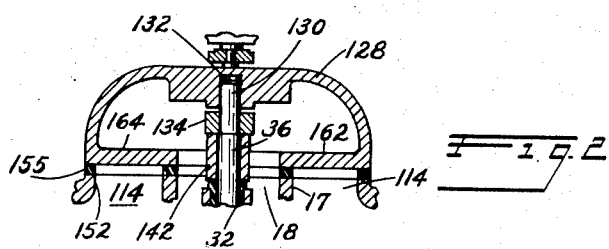

2,627,250

UNITED STATES PATENT OFFICE 2,627,250

PISTON TYPE FLUID METER

Walter H. Marsh, Crafton, Pa., assignor to Rockwell Manufacturing Company, Pittsburgh, Pa., a corporation of Pennsylvania Application March 6, 1947, Serial No. 732,763

1 Claim. (Cl. 121—121)

This invention relates to fluid meters of the positive displacement type, and in particular to that type of displacement meters known as piston meters.

In meters of this type, a series of reciprocating pistons are actuated by the pressure of the fluid flowing through the system in which the meter is installed, to rotate a crankshaft connected to a register for indicating the total volume of fluid which has passed through the meter. The pistons, in their movement, actuate a suitable valve member to control the entrance of the fluid to the working side of the pistons during their working stroke and the exhaust of the fluid from the same side of the pistons and its discharge through a suitable outlet back into the line through which the fluid is flowing.

The illustrated embodiment is of the same general type as those illustrated in the Patent No. 2,106,651, issued January 25, 1938, to Walter H. Parker et al., and the general theory of operation and some of the details of construction are the same as the meter shown in that patent.

I have, however, provided several improvements which, among other things, have the effect of reducing corrosion and wear in the meter parts, whereby the life of the meter is substantially extended and the cost of repair and replacement of worn or corroded parts is reduced. One of these improvements consists in the reconstruction of the meter so that it may be arranged in the piping system with which it is used in such manner that the fluid flows through the meter without being trapped in any pockets or the like wherein impurities such as dirt or sludge, etc., will settle out and remain in the meter so that they get into the working parts thereof to cause their rapid wear or deterioration. When meters of this type are used to measure the rate of substances such as crude oil, the fact that no pockets are provided to allow the impurities in the oil to settle out and impair the operation of the meter is an important factor in extending the life and reducing the wear of the moving parts of the meter. I have also increased the life of the meter by using materials in the construction thereof that have improved characteristics of corrosion resistance and wear resistance.

Accordingly, it is the primary object of my invention to provide an improved fluid meter of such construction that it will be subject to comparatively little wear and will accordingly require a minimum of parts replacement and will have an extended life.

It is another important object of my invention to provide a novel fluid meter having no pockets to collect dirt or sludge or other impurities and which allows these impurities to pass out of the meter with the fluid being measured so that they are not entrapped within the meter to cause wear or corrosion of the parts.

It is another object of my invention to provide a fluid meter having its working elements composed of materials of high corrosion resistance and with a relatively low coefficient of friction with respect to the parts with which they cooperate.

Other objects will become apparent as the description proceeds in connection with the accompanying drawings, wherein:

Figure 1 is a vertical sectional view substantially through the center of a meter;

Figure 2 is a vertical sectional view of the valve shown in Figure 1 and its cooperating seat and passageways, but with the valve rotated through an angle of 90 degrees from the position shown in Figure 1; and Figure 3 is a partial sectional view, substantially along the line 3—3 of Figure 1.

Referring to the drawings, the meter comprises a casing 10 having four integral cylinders arranged in the same horizontal plane and at angles of 90 degrees to each other. Shown in Figure 1 are two coaxial cylinders 12 and 14, and a third cylinder 16 at right angles to the cylinders 12 and 14. The fourth cylinder, which does not appear in the figure, is coaxial with the cylinder 16, as will be understood. At their inner ends the upper portions of the cylinders terminate in a tubular wall 17 forming a central passageway 18 in the upper part of the casing. The wall 17 forming the passageway 18 terminates at its upper end in a horizontal annular surface 20.

Centrally disposed within the passageway 18 is a spider having an annular ring 22 and a coaxial hollow cylindrical hub 24, which is connected to and integral with the ring 22 by means of three equally spaced webs or spokes 26. The ring 22 is seated within an annular seat 28 adjacent the bottom of the passageway 18, and is securely affixed thereto as by means of cap screws 30. Fixedly secured within the central bore of the hub 24, at the top and the bottom thereof respectively, are bearing bushings 32 and 34 respectively, which provide bearings for a vertical crank shaft 36. In order to provide a minimum of friction between the bearings and the crank shaft, I form the bearings of a laminated thermosetting plastic, such as "Micarta." This material is very resistant to corrosion, has good compressive strength, good dimensional stability, low moisture absorption, and a low coefficient of friction with respect to metals such as the steel of the crank shaft 36. While "Micarta" is given as an example of the material used for these bushings and in other parts of the meter structure, as will be apparent as the description proceeds, it is to be understood that any suitable plastic having the characteristics described above can be used.

The inner walls of the cylinders 12, 14, etc., are provided with liners 38 of brass, the liners being tightly fitted within the cylinders but in such manner that they may be removed for replacement. In order to decrease the corrosion of the liners 38 by the fluid which is being metered, and also to decrease the wear resulting from the action of the pistons within the cylinders, the inner surfaces of the liners 38 are chromium-plated and polished.

Each cylinder has mounted for reciprocating motion therein a piston which, among other elements, comprises a head 40. The pistons in the coaxial cylinders 12 and 14 are connected by a rigid Scotch yoke 42 having enlarged lugs 44 at its ends, the lugs being secured to the piston heads 40 by machine screws 46. The outer faces of each piston head 40 is provided with a peripheral recess which receives a flexible washer 48 of rubber, leather or the like. Each recess is curved so that the washer is substantially cup-shaped as shown, with its outer end portion lying against the chromium-plated inner surface of the liner 38. Each washer 48 is clamped within its recess 52 by an annular retainer 50, which is secured to the head 40 by machine screws 54.

An endless spring 56 is partially seated within a peripheral groove in the outer edge of the retainer 50 and is of such diameter that it exerts an outward force around the entire periphery of the retainer 50 and pushes the flexible washer 48 into engagement with the chromium-plated surface of the liner 38.

The Scotch yoke 42 which connects the pistons in the cylinders 12 and 14 has a vertical slot therethrough extending transversely of the yoke, there being a roller 58 disposed between the vertical side walls of the slot and operable to have rolling engagement with the said side walls. A second Scotch yoke 60 joins the two coaxial pistons disposed in the cylinders at right angles to the cylinders 12 and 14, and this Scotch yoke 60 also has a vertical elongated transverse slot 62 shown in Figure 1. A roller 64 is disposed within the slot 62 and the rollers 58 and 64 are rotatably mounted upon a crank pin 66 fixedly attached in vertical position to a crank arm 68 on the bottom end of the crank shaft 36. A valve, which will be described subsequently, controls the application of fluid pressure to the outer ends of the pistons disposed in the cylinders in such sequence that the pistons, through the Scotch yokes 42 and 60, will rotate the crank arm 68 in a horizontal plane to turn the vertical crankshaft 36 in the manner understood by those skilled in the art and as is more fully shown and explained in the aforesaid patent to Parker et al., 2,106,651.

In order to reduce the wear of the rollers 58 and 64 upon the walls of the transverse slots in the yokes 42 and 60, the rectilinear side walls of the slots are provided with hardened stainless steel inserts as shown at 70 and 72 on the yoke 42. The crank arm 68 is provided with a slot to split it vertically and to the left of the crankshaft as shown in Figure 1, whereby it may be clamped securely to the crankshaft by a screw 74. The assembled shaft and arm are then drilled and a pin 76 inserted through the hole to lock the crank arm and crankshaft against relative movement. The crank pin 66 passes through a vertical bore in the crank arm 68 adjacent its outer end, and is fixed thereto in any suitable manner as by a tapered pin 78. The rollers 58 and 64 are journalled for rotation upon the crank pin 66, and are retained thereon by a washer 80, a nut 86 and a cotter pin 88 on its lower threaded end.

As mentioned before, one of the important provisions of my improved meter is a discharge outlet at the bottom thereof rather than near the top, so as to eliminate any pocket into which impurities may settle. As shown in Figure 1, the bottom of the casing 10 has a vertical bore 90 which terminates in an annular planar surface 92. An outlet fitting 94 is seated within the bore 90 and against the surface 92, there being a gasket 96 between the shoulder 92 and the fitting 94. The casing 10 and the fitting 94 are held in assembled relationship by means of cap screws 98 and cooperating lugs 100 and 102 on the casing 10 and the fitting 94 respectively. The fitting 94 has an axial bore provided with standard pipe threads 104 to receive the threaded end of an outlet pipe. The lower end of the fitting 94 also provides a planar annular surface 106 to provide a seat for a cooperating flange which may be attached to the fitting 94 by cap screws engaged in the cap holes 108. Thus the outlet pipe may be directly threaded into the fitting 94 or may be attached thereto by a suitable flange as will be understood.

The fitting 94 includes an integral structure comprising legs 110 extending upwardly into the body of the meter and terminating in a horizontal annular stop member 112 which provides a stationary abutment to engage the lugs 44 on the ends of the Scotch yokes 42 and 60, to thus limit the inward movement of the pistons. In the illustrated embodiment therefore, no means is shown for calibrating the meter by adjusting the stroke of the pistons as disclosed in the previously mentioned Patent 2,106,651. The member 112, however, serves to absorb the shock of stopping the inward movement of the pistons instead of having it absorbed by the walls of the slots in the Scotch yokes 42 and 60.

The casting which provides the casing 10 of the meter is so cored as to provide a passageway 114 along the top of each cylinder 12, 14, etc. Each passageway 114 terminates at its outer end at the outer end of its respective cylinder, and at its inner end in an upwardly directed section ending in a horizontal planar surface which includes the previously mentioned horizontal surface 20 at the upper end of the central passageway 18. Thus the central passageway 18 is surrounded by four independent passageways 114 arranged at equal angles of 90 degrees around the central passageway. A chamber 116 is formed above the casing 10 by a cover member 118 which is secured to the top of the casing 10 by means of cap screws 120, and sealed to the top of the casing by a gasket 122. The chamber 116 forms the inlet chamber to the meter and water entering the meter passes first into the chamber 116 in any suitable manner such as for example the inlet connection 124 having a passageway 126 therethrough communicating with the chamber 116. This inlet connection may be in the body of the cover member 118 as shown or may be in the body of the casing 10 as disclosed in the Patent 2,106,651, as will be understood.

A rotating valve 128, driven by the pistons through the crankshaft 36, directs the flowing fluid alternately through the passageway 114 to the heads of the pistons, or alternately in the other direction from the heads of the pistons and into the central passageway 18, as will be described.

The valve 128 has somewhat the shape of an inverted cup, as shown in Figures 1 and 2. As also shown in Figures 1 and 3, a portion of the outer wall of the valve is depressed so as to uncover one of the passageways 114 and place it in open communication with the chamber 116 in the cover member 118. The crankshaft 36 protrudes through the upper bushing 32 and terminates in a reduced portion 130 which fits into a central internal bore 132 in the valve 128. The valve 128 is thus located and guided by the reduced portion 130 of the crankshaft but the two elements are relatively movable axially as will be explained. A collar 134 is mounted on the crankshaft 36 and secured against rotation by means of a set screw 136. The collar 134 has a bifurcated extension 138, extending radially therefrom, there being a vertical pin 140 passing through but being sealed within the valve 128 and extending through the slot of the bifurcation. A spacer washer 142 surrounds the shaft 36 between the collar 134 and the upper bushing 32 to locate the crankshaft 36 vertically with respect to the bushing. The pin 140 protrudes through the top of the valve 128 as shown in Figure 1, where it is engaged between a pair of spaced, radially extending walls of a slot in a disk 144 affixed to a vertical shaft 146 journalled for rotation centrally within the cover member 118, and protruding into a register housing 148 to drive a meter register (not shown).

Figure 3 shows the equiangular disposition of the passageways 114 around the central passageway 18. The four passageways 114, each of which is independent from the others, are divided in the regions surrounding the passageway 18 by means of common vertical walls 150, which terminate in the same horizontal plane as the annular surface 20 previously described. The horizontal planar surface thus includes the central annular portion 20, an outer annular portion 152, and the upper surfaces of the vertical walls 150. A one-piece valve seat 155 having the same composition as the piston heads 40 and the retainers 50 is cemented to the aforesaid horizontal planar surface and further secured against rotation with respect thereto by a series of pins 156. The valve seat 155 is formed from a sheet of uniform thickness, so that its upper surface is coplanar with the horizontal surface including the annular surface 20. A substantially frictionless and yet watertight seat is thus provided between the plastic seat 155 and the valve 128, which is of cast iron and tends to be self lubricating with respect to the seat 155 because of the graphite in the cast iron.

The open ends of the cylinders 12, 14, etc., are closed and placed in communication with the cylinders 114 by clinder heads 158 secured to the casing 10 by cap screws 160.

The valve 128, although located by the engagement of the reduced portion 130 of the crankshaft in the bore 132, is held in the top surface of the valve seat 156 solely by its own weight and by the differential pressure between the water in the inlet chamber 116 and the pressure of the liquid on the underside of the valve member. As shown in the drawings, in Figure 1 the valve 128 is so positioned that fluid is being admitted from chamber 116 through a passageway 114 to the outer end of the cylinder 12. At the same time, fluid is being discharged from the outer end of the cylinder 14, through a passageway 114 to the underside of the valve 128, and thence to the central passageway 18 where it passes vertically downward and through the outlet fitting 94.

At the same time, the passageways 114 to the other two cylinders extending at right angles to the cylinders 12 and 14, are closed by the horizontal portions 162 and 164 of the valve 128, as shown in Figures 2 and 3. Figure 2 therefore also illustrates the position of the valve 128 when it has rotated through an angle of 90 degrees from the position shown in Figure 1.

I have therefore provided an improved meter for measuring the flow of fluid through a conduit, the meter being adapted to be inserted into the conduit in any convenient location. By reason of the fact that the fluid enters the meter adjacent the upper portion thereof and, after passing through the meter, is discharged through its lower part, I have eliminated the formation of internal pockets or chambers where impurities may settle out and increase in volume as time goes on to such an extent that they seriously interfere with the operation of the working parts of the meter. Even when there is not a substantial accumulation of such impurities, they are stirred up by the operation of the meter and enter the working parts thereof so that their corrosive and abrasive action will substantially shorten the life of the meter. By making certain parts of the meter of a plastic having a high corrosion resistance as well as low coefficient of friction with respect to the metals which engage it, I have also provided a meter requiring a minimum of replacement parts and having a maximum life.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

In a positive displacement fluid meter, casing structure, a central passageway formed through the lower portion of said casing structure, a plurality of pairs of coaxially aligned cylinders formed in said lower portion of the casing structure radiating in said lower portion of the casing structure radiating from said central passageway and circumferentially spaced about the axis thereof, a piston assembly comprising a pair of opposed pistons rigidly connected for conjoint movement and mounted for reciprocation in each of said cylinder pairs, a stop member fixed to the inner face of each of said pistons, a crank shaft journalled for rotation in said casing structure substantially coaxial with said central passageway, means interconnecting said pistons with said crank shaft to impart rotary motion to the latter from reciprocating movement of the former, a fluid inlet chamber formed in the upper portion of said casing structure, a fluid inlet port opening into said inlet chamber, a wall separating said inlet chamber from said lower portion of the casing structure having thereon means defining a planar surface within said inlet chamber, an individual passage formed through said wall planar surface and said casing structure lower portion to the outer end of each of said cylinders, an aperture formed in the lowest portion of said casing structure in substantially coaxial alignment with said central passageway, a fitting formed with a central opening received in said aperture to provide a coaxial fluid outlet port in the bottom of said central passageway, said fitting having an upwardly projecting portion extending into said central passageway between said cylinder pairs and defining a stop for said pistons sequentially engaged by said stop members on said pistons to limit inward movement of said pistons, a central opening formed through said wall planar surface and opening into said central passageway in coaxial alignment with said outlet port, and a rotary valve member cooperatively engaging said wall planar surface and driven by said crank shaft to alternately connect said cylinder passageways to said inlet chamber and to said central passageway.

WALTER H. MARSH.

REFERENCES CITED

The following references are of record in the file of this patent:

UNITED STATES PATENTS

| Number | Name | Date |
|---|---|---|
| 492,267 | Bruce | Feb. 21, 1893 |
| 1,762,949 | Bassett | June 10, 1930 |
| 1,893,429 | McGogy | Jan. 3, 1933 |
| 1,905,062 | Schaeffers | Apr. 25, 1933 |
| 1,911,521 | Marsh | May 30, 1933 |
| 1,923,790 | Moore | Aug. 22, 1933 |
| 2,035,338 | Parker | Mar. 24, 1936 |
| 2,091,912 | DeLancey | Aug. 31, 1937 |
| 2,106,651 | Parker | Jan. 25, 1938 |
| 2,304,371 | Queneau et al. | Dec. 8, 1942 |
| 2,332,787 | Fleming | Oct. 26, 1943 |
| 2,338,480 | Auxier | Jan. 4, 1944 |
| 2,351,732 | Almond et al. | June 20, 1944 |
| 2,356,273 | Risser | Aug. 22, 1944 |
| 2,387,181 | Procter | Oct. 16, 1945 |
| 2,394,243 | Joyce | Feb. 5, 1946 |
| 2,413,034 | De Lancey | Dec. 23, 1946 |
| 2,429,426 | Phillips et al. | Oct. 21, 1947 |
| 2,464,499 | Gilmore | Mar. 15, 1949 |

FOREIGN PATENTS

| Number | Country | Date |
|---|---|---|
| 471,447 | Great Britain | Sept. 6, 1937 |